INVENTOR.
FORREST A. NELSON
BY
ATTORNEY

INVENTOR.
FORREST A. NELSON
BY Wm J Nolan
ATTORNEY

United States Patent Office 3,501,688
Patented Mar. 17, 1970

3,501,688
GYROMAGNETIC RESONANCE SPECTROMETER PROGRAMMED FOR AUTOMATIC SCAN AND CALIBRATION CYCLES
Forrest A. Nelson, Palo Alto, Calif., assignor to Varian Associates, Palo Alto, Calif., a corporation of California
Filed Aug. 21, 1967, Ser. No. 661,986
Int. Cl. G01n 27/78
U.S. Cl. 324—.5                                                   2 Claims

ABSTRACT OF THE DISCLOSURE

A programmer causes the spectrometer to alternately scan through the spectrum of the sample and to engage in a calibration cycle during which one or more of the operating parameters such as polarizing magnetic field intensity, magnetic field homogeneity, spin decoupling field strength, etc. may be calibrated.

Description of the prior art

Heretofore, gyromagnetic resonance spectrometers have employed means for automatic calibration of the spectrometer. Such calibrating means have included automatic field-frequency controllers which hold the ratio of polarizing field to the frequency of the R.F. resonance exciting field at a predetermined and controlled ratio. Also such automatic calibrating means have included automatic polarizing field homogenizing circuits for maintaining a homogeneous field within the sample. However, these automatic calibrating devices have been operated during the scan of the spectrum under analysis. Not all spectrometers will permit simultaneous scan of the sample under analysis and calibration, especially as to certain of the operating conditions to be calibrated. For example, polarizing field homogeneity calibration is difficult during the scan cycle in a magnetically scanned spectrometer. Moreover, the calibration effects during the scan cycle may introduce errors or noise onto the spectrum being observed.

Summary of the present invention

The principal object of the present invention is the provision of an improved gyromagnetic resonance spectrometer.

One feature of the present invention is the provision, in a gyromagnetic resonance spectrometer, of a programmer for automatically sequencing the spectrometer through repetitive scan and calibration cycles, whereby calibration of the spectrometer is maintained automatically.

Another feature of the present invention is the same as the preceding feature wherein, during the calibration cycle, one or more of the following operating conditions of the spectrometer are calibrated: polarizing magnetic field intensity, frequency of the radio frequency resonance exciting field, scan rate, polarizing magnetic field homogeneity, sample spinning rate, spin decoupling radio frequency field strength and/or frequency.

Another feature of the present invention is the same as any one or more of the preceding features wherein the spectrometer is magnetically scanned and the programmer, during the calibration cycle, sequences the calibration of the homogeneity of the polarizing magnetic field and the ratio of the intensity of the polarizing magnetic field to the frequency of the resonance exciting radio frequency field.

Another feature of the present invention is the same as the preceding feature wherein the spectrometer employs an internal control group having a resonance line which is substantially displaced from the spectrum lines being scanned and wherein a bias D.C. polarizing field is provided which is switched by the programmer to switch the spectrometer from the spectrum under analysis to the control line during the calibration cycle.

Other features and advantages of the present invention will become apparent upon a perusal of the following specification taken in connection with the accompanying drawings wherein:

Description of the preferred embodiments

Figure 1:
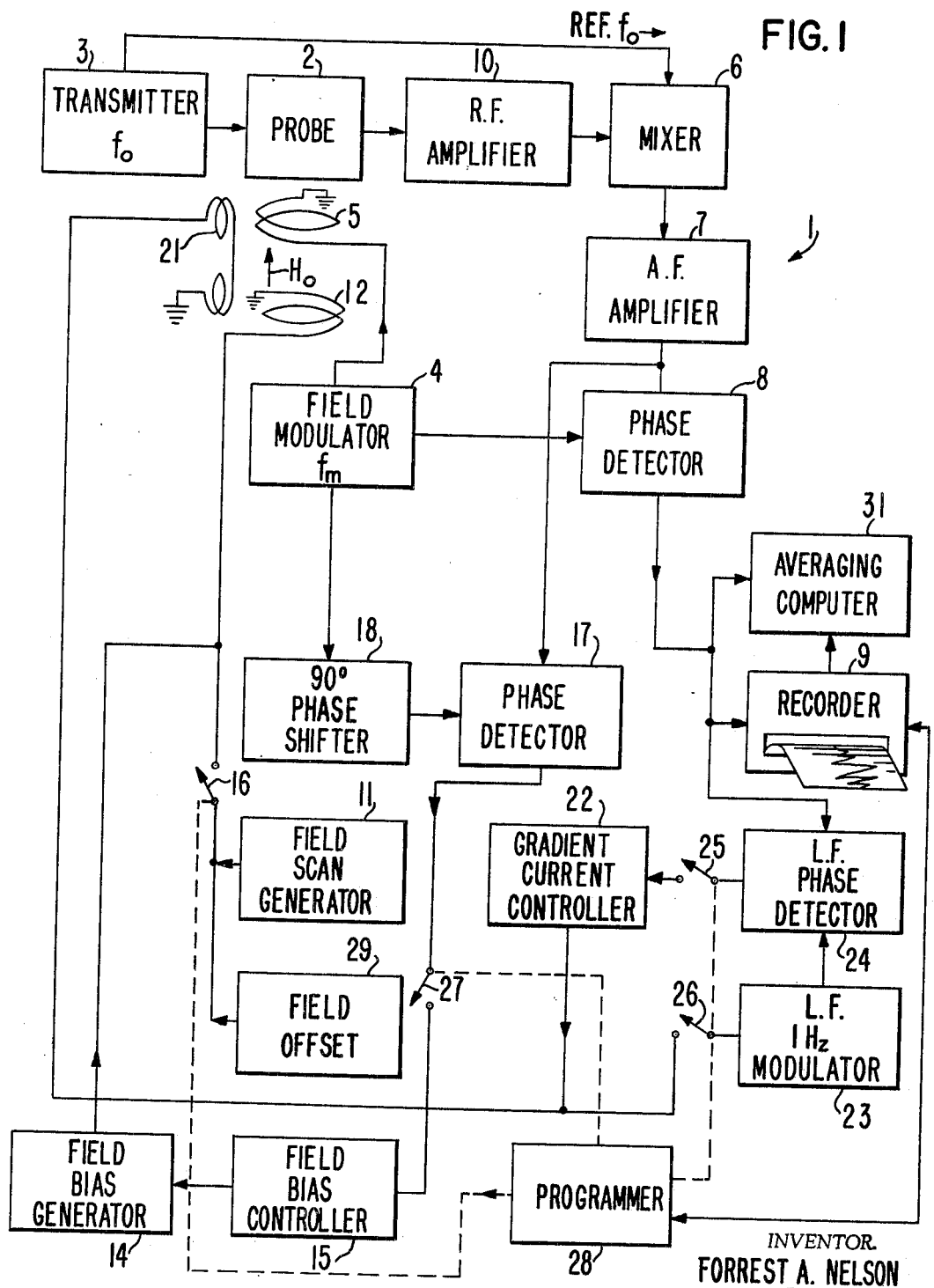
FIG. 1 is a schematic block diagram of a gyromagnetic resonance spectrometer employing features of the present invention.

Referring now to FIG. 1, there is shown a gyromagnetic resonance spectrometer 1 incorporating features of the present invention. The spectrometer 1 includes a probe 2 for containing a sample of gyromagnetic resonance matter to be analyzed. The probe 2 immerses the sample in a D.C. polarizing magnetic field $H_0$, as of 15 kg. A radio frequency (R.F.) transmitter 3 supplies a fixed R.F. signal to the probe 2. The probe 2 contains a coil structure for producing an alternating magnetic field in the sample at the frequency of the transmitter $f_0$ and which alternating field is at right angles to the D.C. magnetic field $H_0$. An audio frequency field modulator 4 modulates the polarizing magnetic field $H_0$ via coil 5 at a convenient audio frequency $f_m$, as of 100 kHz. The transmitter frequency $f_0$ and the audio frequency $f_m$ are selected relative to the D.C. magnetic field intensity $H_0$ such that they produce resonance of the sample under analysis at the frequency $f_0+f_m$ (sum frequency).

Resonance of the sample under analysis is picked up by coil structure in the probe 2 and fed to an R.F. amplifier 10 wherein it is amplified and fed to one input of a mixer 6. A sample of the transmitter signal at $f_0$ is fed to the other input terminal of the mixer 6. The two signals are mixed to yield an output resonance signal at the audio modulation frequency $f_m$. The audio resonance signal is amplified in audio amplifier 7 and fed to one input of a phase sensitive detector 8. The other input of the phase sensitive detector is supplied with a reference signal at the field modulation frequency $f_m$. The phases of the inputs to the phase detector 8 are adjusted to produce an absorption mode D.C. resonance output signal which is fed to a recorder 9 and recorded as a function of time or field scan. The D.C. magnetic field $H_0$ is scanned across the resonance spectrum of the sample by superimposing a time varying scan component on the D.C. polarizing magnetic field. The scan signal is derived from a scan generator 11 and fed to a coil 12 for scanning the field.

The probe 2 also includes a control sample of gyromagnetic resonance matter. A suitable control sample is tetramethylsilane (TMS) which is disposed essentially in the same region of the probe 2 as the sample under analysis. This is accomplished by intermixing TMS with the sample under analysis or disposing the samples in separate concentric cylindrical compartments which are closely spaced to each other.

A magnetic field bias generator 14 and a bias controller 15, which controls the current level output of the bias generator 14, supplies a D.C. current to coil 12. The current output of the bias generator 14 is set to produce a magnetic field bias component that, when superimposed upon the D.C. polarizing field $H_0$, changes the total polarizing field to such a value as to produce resonance of the control sample at the sum frequency of the field modulation frequency $f_m$ and the transmitter frequency $f_0$. Thus, when switch 16 is opened resonance of the control sample is excited. This resonance is picked up, amplified and detected in the same manner as the resonance of the sample under analysis, as previously described.

However, a second phase sensitive detector 17 has one of its input terminals connected to receive the control sample audio resonance signal from the output of the audio amplifier 7. The other input terminal of phase sensitive detector 17 is connected to the reference output of the field modulator 4 via a 90° phase shifter 18 such that the output of the second phase sensitive detector 17 will be a D.C. component from the dispersion mode resonance signal. This dispersion mode signal is used as an error signal to regulate the D.C. polarizing magnetic field, via field bias controller and generator units 14 and 15, respectively, to a value which maintains the ratio of D.C. polarizing field intensity to the frequency of the applied alternating magnetic field ($f_0 + f_m$) at a constant determined by resonance of the control sample. This regulation serves to maintain the precise resonance conditions for sustained maximum resonance of the control sample.

A circuit is also provided for automatically correcting the homogeneity of the D.C. polarizing magnetic field in which the samples are immersed. More particularly, a gradient coil 21 is energized from a D.C. current control 22 to produce a given gradient in the D.C. polarizing magnetic field, such gradient being adjusted to just cancel a certain residual gradient in the D.C. polarizing field, thereby homogenizing same. The current in the gradient cancelling coils 21 is adjusted by an automatic control circuit described and claimed in co-pending U.S. application 372,626, filed June 4, 1964 now U.S. Patent 3,443,209, issued May 6, 1969, and assigned to the same assignee as the present invention.

Briefly, the automatic gradient cancelling circuit includes a low frequency modulator 23 which modulates the D.C. current in the gradient cancelling coils 21 at a convenient low frequency, as of 1 Hz. This modulation of the gradient causes the amplitude of the resonance of the control line to vary. The amplitude modulation of the resonance will have a fundamental component at the modulation frequency. This fundamental modulation component goes to a zero amplitude when the D.C. gradient cancelling component is precisely at a value to provide optimum homogeneity.

Thus, the modulator control line absorption signal is sampled from the output of phase detectors 8 and fed to one input terminal of a phase sensitive detector 24 wherein it is compared with a sample of the low frequency gradient modulation signal sampled from the low frequency modulator 23. The output of the phase sensitive detector 24 is a D.C. error signal of a phase and magnitude for correcting the D.C. gradient cancelling current in coils 21 and this error signal is fed to current controller 22.

Calibration switches 25 and 26 are placed in the leads to the current generator 22 and gradient coils 21 such as to, when opened, stop modulation of the gradient cancelling current and to fix the gradient cancelling current at the optimum value as determined by the previous calibration measurement. Likewise, calibration switch 27 is connected to the input to the field-frequency regulator comprising field bias generator and controller 14 and 15, respectively, such that when calibration switch 27 is opened the D.C. magnetic field will be calibrated to that value as determined by the previous field-frequency calibration measurement.

A programmer 28 controls calibration switches 16, 25, 26 and 27 according to a predetermined sequence such that the sample under analysis is scanned during one time period and the spectrometer calibrated during another period. During the calibration period or cycle the D.C. field is automatically homogenized and the field-frequency ratio automatically regulated. In this manner, a magnetic field scan may be employed in a spectrometer having both field-frequency control and automatic homogeneity control.

Figure 2:
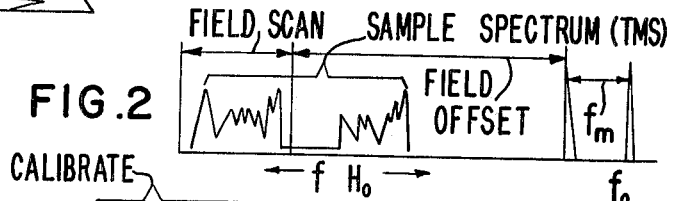
FIG. 2 is a gyromagnetic resonance spectrum depicting the sample spectrum and the control line.
Figure 3:
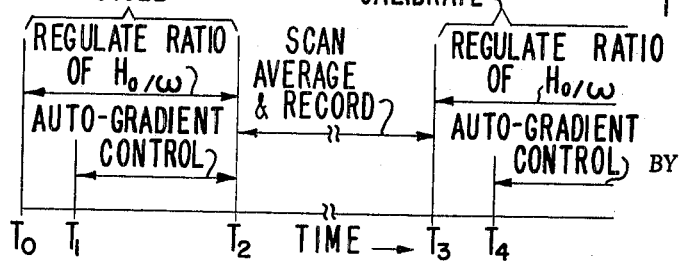
FIG. 3 is a time sequence diagram depicting the time sequence of operating functions performed by the spectrometer of FIG. 1.

In operation, field bias generator 14 and controller 15 are initially set to obtain resonance of the control sample with switch 16 open. A field offset generator 29 is set to provide sufficient current to coil 12 to shift the polarizing field from that value determined by the control sample to a value from which to initiate the field scan, see FIG. 2. The programmer 28 is then actuated at $T_0$ (see FIG. 3) and it opens switches 16, 25 and 26 and closes switch 27. In addition, the programmer 28 stops the recorder 9. The spectrometer operates for a few seconds on the field-frequency regulation mode during which time the bias field is automatically calibrated to sustain resonance of the control sample. When the spectrometer is stabilized, after a few seconds, the programmer 28 closes switches 25 and 26, at $T_1$, thereby actuating the automatic homogeneity calibration. After a few seconds, the homogeneity and field-frequency have been optimized and calibrated. The programmer 28 then, at $T_2$, initiates the scan cycle by closing switch 16 and opening switches 25, 26 and 27. In addition, the programmer 28 starts the recorder 9. During the scan cycle, which may last several minutes, the initial values of current from the field bias and gradient control units are fixed at their predetermined values. When the scan is complete at $T_3$, the recorder 9 sends a signal to the programmer 28 to initiate the calibration cycle, and so on and so forth, for many repetitive cycles. During the scan cycle the output spectrum signal of the sample under analysis is also being fed to an averaging computer 31 for integrating the many repetitive spectrums to yield enhanced signal-to-noise ratio.

Figure 4:
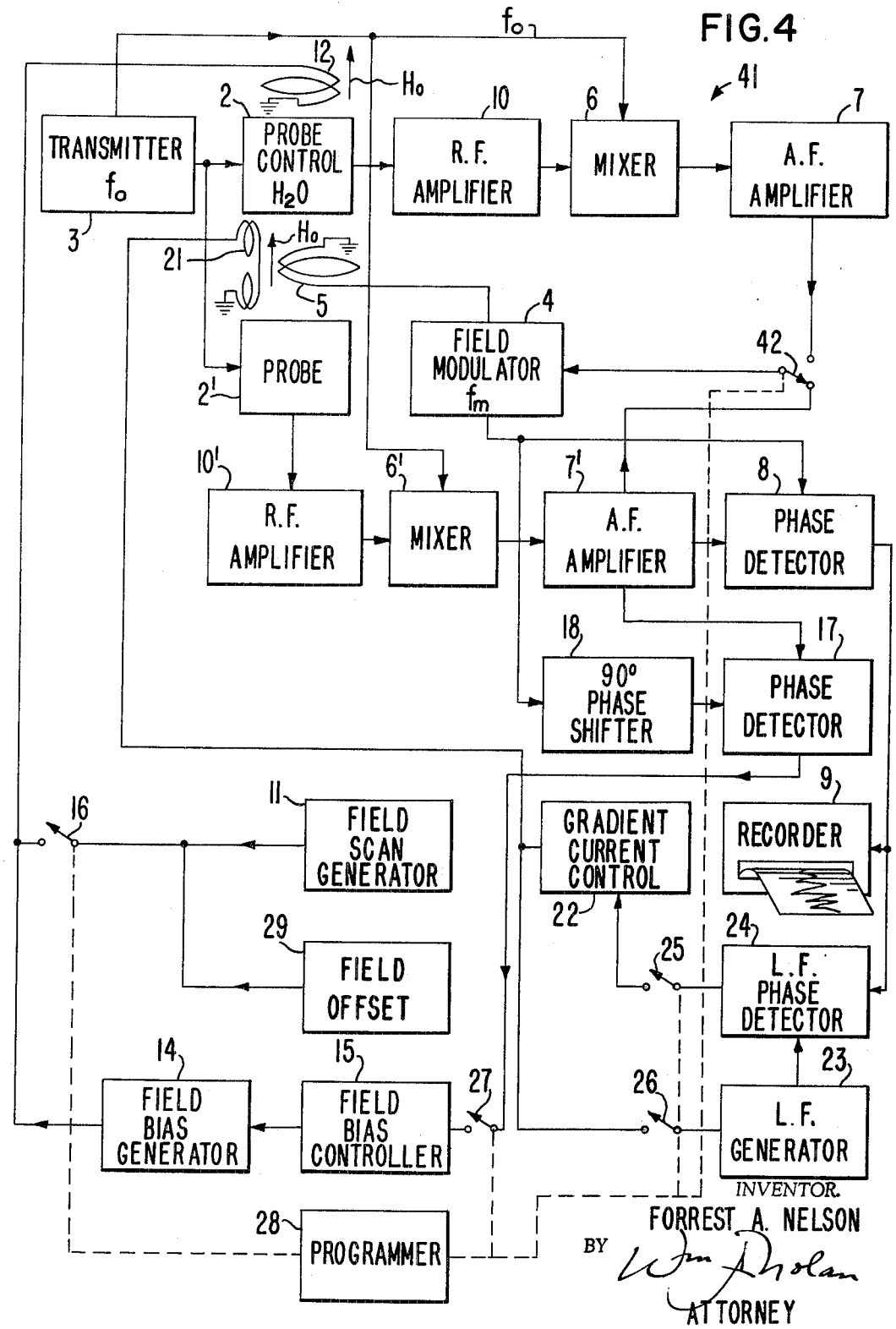
FIG. 4 is a schematic block diagram of an alternative embodiment of a gyromagnetic resonance spectrometer employing features of the present invention.

Referring now to FIG. 4, there is shown an alternative gyromagnetic resonance spectrometer 41 employing features of the present invention. The spectrometer is similar to that of FIG. 1 except that the D.C. magnetic field is modulated with a variable audio frequency corresponding to the audio sideband of a gyromagnetic sideband oscillator. The audio frequency of the sideband oscillator is scanned by scanning the polarizing magnetic field within the control sample of the sideband oscillator without scanning the intensity of the polarizing magnetic field within the sample under analysis. During the scan cycle, the external control sample is employed. However, during the calibration cycle, an internal control sample, such as TMS, is employed.

More specifically, the probe is separated into two probe portions 2 and 2'. Probe portion 2 contains the external control sample, such as water. Resonance of the external control sample is picked up, as in FIG. 1, except that the audio frequency resonance output of audio frequency amplifier 7 is employed as the frequency of the field modulator 4. The field modulation occurs at a frequency which will sustain resonance of the control sample in the polarizing magnetic field in which it is immersed. Thus, the field modulation frequency may be scanned by scanning the field produced by the field scan generator 11.

The sample under analysis and a second control sample (TMS) are placed in the second probe portion 2' which is immersed in the polarizing magnetic field $H_0$, but which does not see the scanning D.C. field component produced by the field scan 11 and coil 12. However, the second probe 2' does "see" the variable audio frequency modulating field produced by the field modulator 4 and coil 5. When the audio field modulation is at a frequency to produce resonance of the sample under analysis or internal control sample in the second probe 2', resonance is detected in the same manner as previously described with regard to FIG. 1. A switch 42 is provided in the output of the analysis channel's audio amplifier 7' for switching a portion of its output with correct amplitude and phase into the field modulator 4 in place of the output of the control sample amplifier 7. When switch 42 is switched to the second audio amplifier 7' the spectrometer will lock onto resonance of the internal control sample (TMS), provided the proper operating conditions of field and frequency are met which will be more fully described below.

In operation, the field scan switch 16 is opened and the field bias generator 14 and field bias controller 15 are set to bias the magnetic field within the external control group relative to the field within the internal sample (TMS) such that both groups have the same resonance frequency. Under these conditions resonance of the internal control sample (TMS) is obtained within probe 2' even though switch 42 is connected to the control channel amplifier 7. After resonance of the TMS line has been established, i.e., about 1 second, switch 42 is switched to the analysis channel amplifier 7' by the programmer 28 and, in addition, the programmer 28 closes calibrating switch 27 to automatically calibrate the ratio of polarizing field intensity to frequency, as previously described. After the system has stable field-frequency calibration, at $T_1$, the programmer 28 closes calibrating switches 25 and 26 to obtain automatic magnetic field homogeneity calibration. After the field has been homogenized, at $T_2$, the programmer 28 closes field scan switch 16, channel switch 42 to external control amplifier 7, and opens calibrate switches 25, 26 and 27, thereby initiating the scan cycle, as previously described. When the sacn cycle is completed, at $T_3$, the recorder 9 sends a signal to the programmer 28 and, at $T_3$, it opens scan switch 16, thereby reverting to the initial field bias settings for TMS resonance. After a 1 second delay for resonance of the TMS sample to be established, channel switch 42 is switched by programmer 28 to the internal control amplifier 7' and then the programmed alternating calibrate and scan cycles repeat themselves automatically, as previously described.

Figure 5:
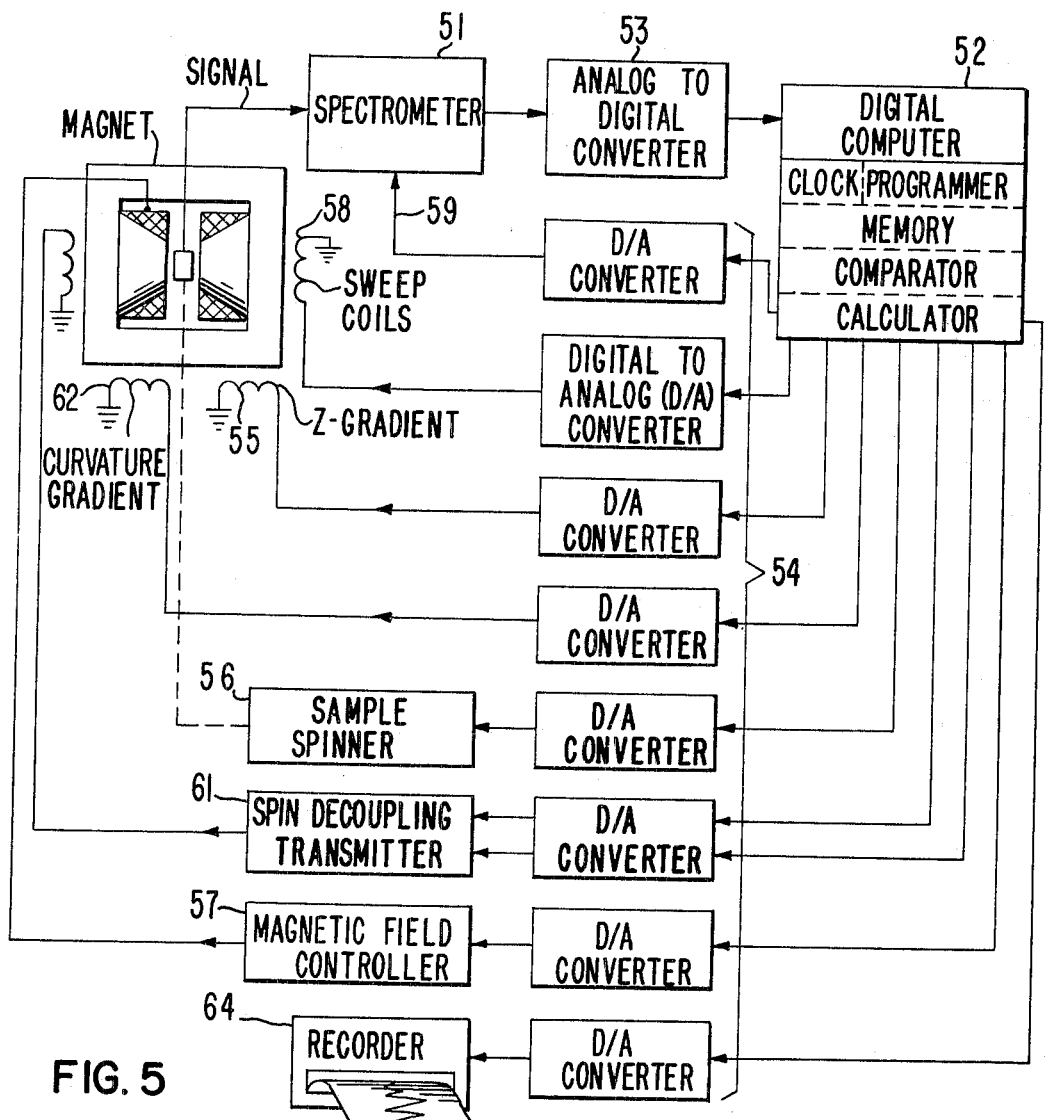
FIG. 5 is a schematic block diagram of an alternative spectrometer embodiment of the present invention employing a computer for controlling the scan and calibration cycles.

Referring now ot FIG. 5, there is shown an alternative spectrometer embodiment incorporating features of the present invention. A spectrometer 51, which may be essentially the same as those described in FIGS. 1 and 4, has its output fed to a digital computer 52 via the intermediary of an analog-to-digital converter 53. The digital computer 52 includes its internal clock, programmer for determining its various sequences, memory, comparator circuits, and calculator. The computer calibrated spectrometer forms the subject matter of and is claimed in copending U.S. application 661,985, filed Aug. 21, 1967 and assigned to the same assignee as the present invention.

The computer 52 senses the resonance signal from the spectrometer 51 and sequentially selects some specific parameter of the resonance signal for measurement according to its internal porgrammer. Such specific parameters of the resonance signal would include any one of the following: signal height, line width, second moment of the line, height of the first wiggle, and line position. The computer 52, according to its program, determines from these specific measured parameters, as by comparison against a set of corresponding calibration parameters or by changing the spectrometer operating conditions and converging on the optimum, an optimum set of operating parameters. The calculator generates a set of correction signals which are fed via various digital-to-analog converters 54 to the appropriate portion of the spectrometer for setting the various optimum operating conditions. For example, to optimize the homogeneity of the field in the Z-direction, i.e., to cancel the residual Z-gradients in the polarizing field, the computer 52 would switch operation of the spectrometer 51 to an internal control group such as TMS. The computer 52 would then vary the Z-gradient correction by varying the current to the Z-gradient coils 55. The computer 52 would compare the change in the TMS resonance signal height with the current to the gradient coils 55 to derive the optimum Z-gradient cancelling current. This optimum current would be fed to the Z-gradient coils during the subsequent scan cycle.

Likewise, the computer 52 corrects the rate at which the sample is spun via sample spinner 56 for maximum TMS signal height. The computer 52 measures the resonance frequency of the TMS line and determines the proper calibration of the polarizing magnetic field intensity and sets the field to the proper intensity via magnetic field controller 57. The computer 52 measures the distortions of the scanned TMS line signal to determine the proper sweep rate of current supplied to the sweep coils 58. The computer 52 scans the TMS line and measures the TMS signal line width as a function of the TMS resonance exciting radio frequency field strength to derive the optimum R.F. field intensity calibration as fed to the spectrometer 51 via lead 59.

In spin decoupling measurements, the computer 52 varies the strength and frequency of the spin decoupling radio frequency field while measuring the effects on a spin coupled sample to obtain optimum field strength and frequency calibration for the spin decoupling transmitter 61.

The computer 52 measures the second moment of the scanned TMS line to derive the optimum calibration for the current supplied to the curvature gradient cancelling coils 62.

After the computer 52 has calibrated the spectrometer 51 for its optimum set of operating parameters, it holds them fixed at these values during the subsequent scan cycle. The computer 52 accumulates the spectral data obtained during the scan cycles in its memory and feeds same to a readout such as recorder 64. The computer 52 may average the spectral data from a number of scans of a sample under analysis to provide improved signal-to-noise ratio.

Since many changes could be made in the above construction and many apparently widely different embodiments of this invention can be made without departing from the scope thereof it is intended that all matter contained in the above description or shown in the accompanying drawings shall be interpreted as illustrative and not in a limiting sense.

What is claimed is:

1. In a gyromagnetic resonance spectrometer, means for applying an alternating magnetic field of a certain frequency to a sample of gyromagnetic resonance matter under analysis within a D.C. polarizing magnetic field to excite resonance of the sample under analysis, means for scanning the intensity of the polarizing magnetic field to produce a scan of at least a portion of the resonance spectrum of the sample under analysis, means for automatically calibrating the homogeneity of the polarizing magnetic field within the sample under analysis, means for automatically calibrating the ratio of the polarizing magnetic field intensity to the frequency of the applied alternating magnetic field to a predetermined constant value, the improvement comprising, programmer means for automatically and repetitively activating said magnetic field scanning means, and said homogeneity calibrating means during different time periods in accordance with a predetermined time sequence and a gyromagnetic resonance oscillator operating in the D.C. polarizing magnetic field at resonance of a first control group, and wherein the applied alternating field for exciting resonance of the sample under analysis is derived from said gyromagnetic oscillator, and wherein the spectrum of the sample under analysis is scanned by scanning the polarizing magnetic field within the control group of said gyromagnetic oscillator, whereby the frequency of the alternating magnetic field applied to excite resonance of the sample under analysis is scanned in frequency through at least a portion of the resonance spectrum of the sample under analysis.

2. The apparatus of claim 1 wherein said automatic homogeneity calibrating means and said field-to-frequency calibrating means include means for exciting and detecting resonance of a second control sample of gyromagnetic resonance matter which is disposed in essentially the same region of polarizing magnetic field as that occupied by the sample under analysis, and wherein the second control sample has a resonant frequency removed substantially from the scanned spectrum portion of the the sampe under analysis, and means for producing an offset D.C. magnetic field which is superimposed on the polarizing magnetic field within the first control group of said gyromagnetic oscillator, and means for switching on and off the offset magnetic field to shift between resonance of the sample under analysis and the second control sample.

References Cited

UNITED STATES PATENTS

| | | | |
|---|---|---|---|
| 3,109,138 | 10/1963 | Varian | 324—0.5 |
| 3,127,556 | 3/1964 | Gielow | 324—0.5 |
| 3,173,083 | 3/1965 | Anderson | 324—0.5 |
| 3,388,322 | 6/1968 | Anderson | 324—0.5 |

OTHER REFERENCES

A-60 Analytical Spectrometer System, Varian Associates (Instrument Div.), pp. 1–16, pub. 2/61.

HA-100, DA-60, HA-60, Nuclear Magnetic Resonance Spectrometers, Varian Associates (Instrument Div.), pp. 1–20, pub. 7/66.

RUDOLPH V. ROLINEC, Primary Examiner

M. J. LYNCH, Assistant Examiner